US012626594B2

(12) United States Patent
Lee

(10) Patent No.: US 12,626,594 B2
(45) Date of Patent: May 12, 2026

(54) VEHICLE MATCHING SYSTEM AND METHOD OF THEREOF

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 243 days.

(21) Appl. No.: 18/391,933

(22) Filed: Dec. 21, 2023

(65) Prior Publication Data

US 2024/0312346 A1 Sep. 19, 2024

(30) Foreign Application Priority Data

Mar. 16, 2023 (KR) ........................ 10-2023-0034659

(51) Int. Cl.
*G08G 1/16* (2006.01)
*G01S 13/931* (2020.01)
*H04W 4/46* (2018.01)

(52) U.S. Cl.
CPC ............ *G08G 1/161* (2013.01); *G01S 13/931* (2013.01); *H04W 4/46* (2018.02); *G01S 2013/93272* (2020.01)

(58) Field of Classification Search
CPC ....... G08G 1/161; H04W 4/46; G01S 13/931; G01S 2013/93272; G01S 2013/9316; G01S 7/006; G01S 13/22; G01S 13/325; G01S 13/343; G01S 13/536; B60W 2420/408; B60W 40/02; H04B 2001/6912
See application file for complete search history.

(56) References Cited

U.S. PATENT DOCUMENTS

| | | | | |
|---|---|---|---|---|
| 2019/0342859 | A1* | 11/2019 | Rubin | ...................... H04W 4/12 |
| 2020/0174096 | A1* | 6/2020 | Cho | ........................ G01S 13/343 |
| 2022/0335826 | A1* | 10/2022 | Tsuda | .............. G08G 1/096741 |

FOREIGN PATENT DOCUMENTS

KR 102075831 B1 2/2020

* cited by examiner

*Primary Examiner* — Sisay Yacob
(74) *Attorney, Agent, or Firm* — NovoTechIP International PLLC

(57) ABSTRACT

Unique information is included through V2V communication and transmitted to all vehicles within a communication range. By using a radar sensor in a rear vehicle to transmit ASK-modulated unique information limited to a front vehicle area, the utilization of V2V communication data can be improved through matching of unique information.

8 Claims, 10 Drawing Sheets

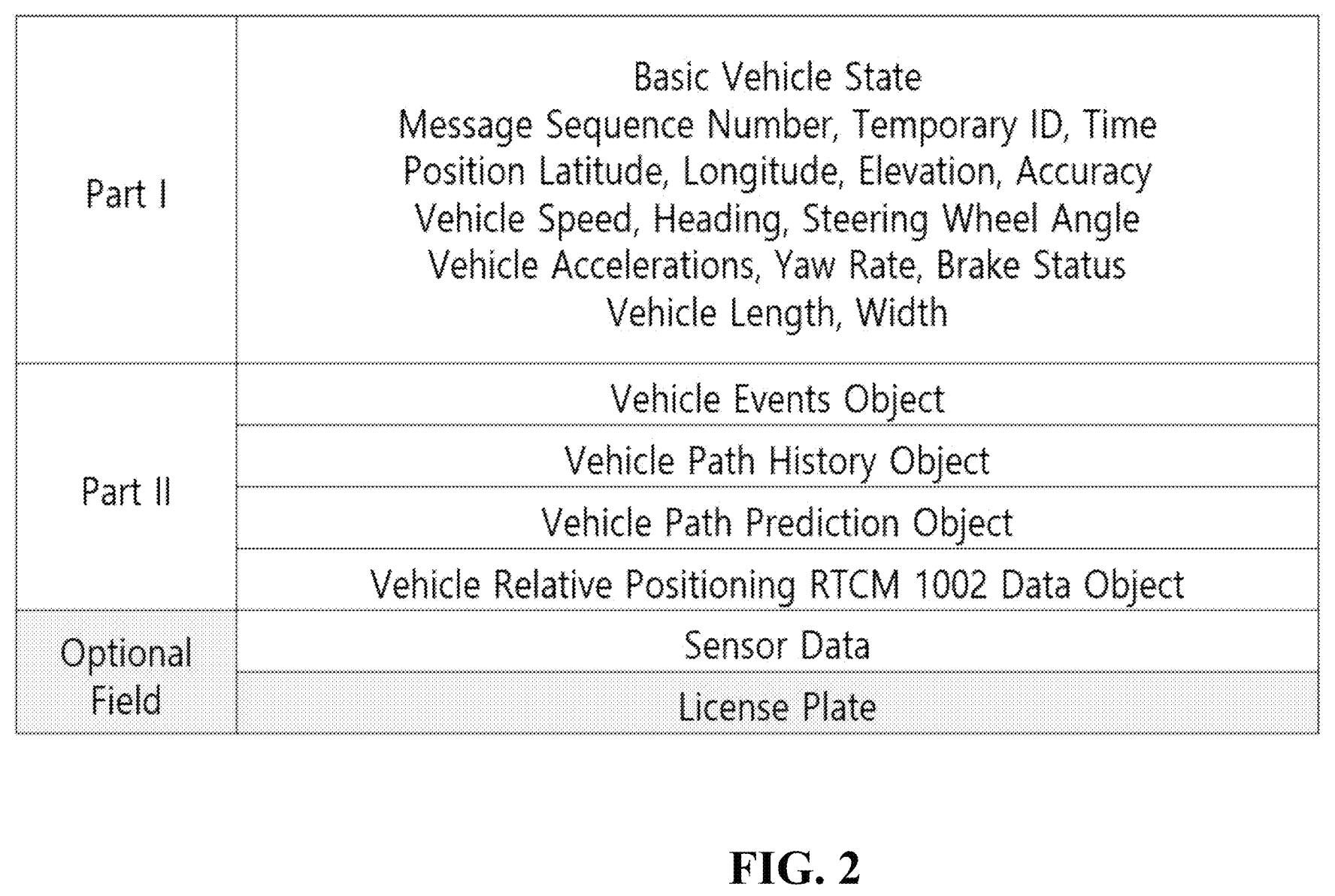

| Part I | Basic Vehicle State<br><br>Message Sequence Number, Temporary ID, Time<br>Position Latitude, Longitude, Elevation, Accuracy<br>Vehicle Speed, Heading, Steering Wheel Angle<br>Vehicle Accelerations, Yaw Rate, Brake Status<br>Vehicle Length, Width |
| Part II | Vehicle Events Object<br><br>Vehicle Path History Object<br><br>Vehicle Path Prediction Object<br><br>Vehicle Relative Positioning RTCM 1002 Data Object |
| Optional Field | Sensor Data<br><br>License Plate |

FIG. 2

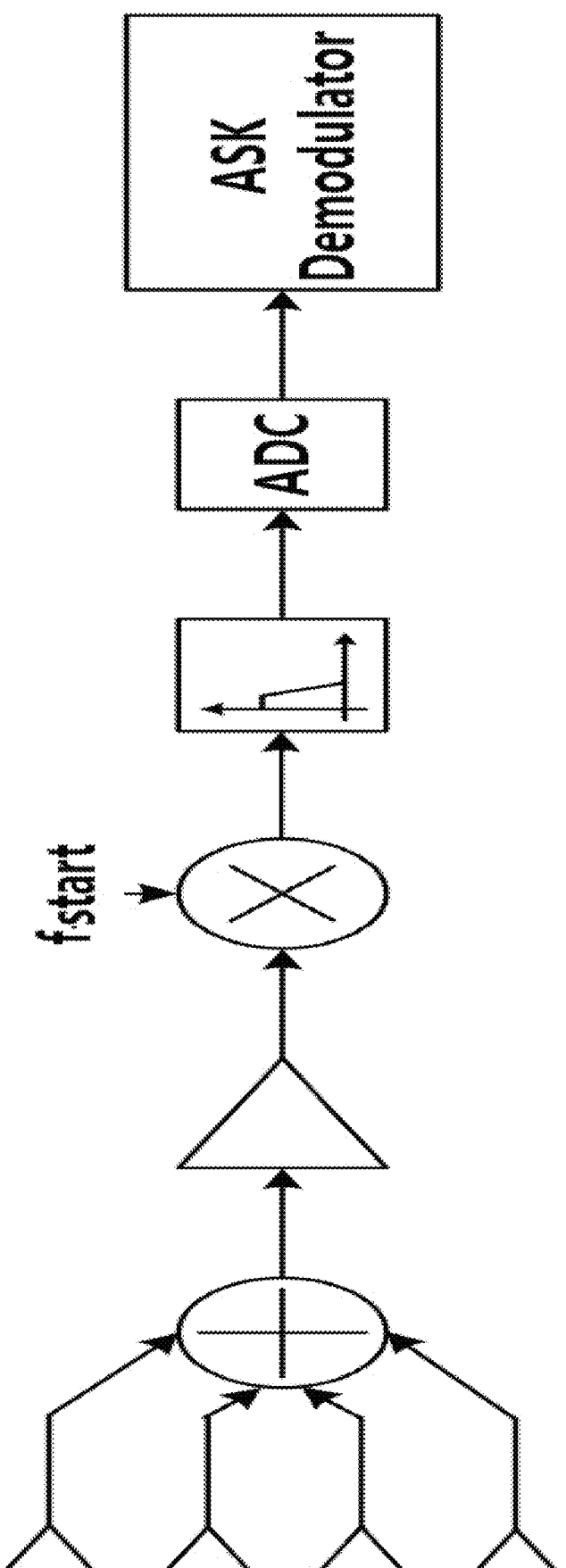
FIG. 8

Transmit data including V2V based unique information — S100

Transmit radar signal including unique information — S200

Receive radar signal including unique information — S300

Analyze radar signal — S400

Receive data including V2V based unique information — S500

Determine matching of unique information — S600

YES

Association processing of matching data — S700

VEHICLE MATCHING SYSTEM AND METHOD OF THEREOF

CROSS-REFERENCE TO RELATED APPLICATIONS

The present application claims priority to Korean Patent Application No. 10-2023-0034659, filed Mar. 16, 2023, the entire contents of which is incorporated herein for all purposes by this reference.

TECHNICAL FIELD

The present invention relates to a vehicle matching system and method thereof. More specifically, the present invention relates to a vehicle matching system that uses a principal vehicle's RADAR sensing technology to match information on a vehicle running behind the principal vehicle among the information received based on V2V communication with vehicles driving around the principal vehicle, and a method thereof.

BACKGROUND

For precise position recognition through high-definition (HD) map and global positioning system (GPS), coordinate information of each object (vehicle) is shared in real time through a vehicle-to-anything (V2X) system, so that it is possible to implement an autonomous driving system without sensors.

However, the HD Map maintenance process cannot be performed in real time, and errors in GPS coordinates and shaded areas cause lowering of the accuracy of position recognition.

Moreover, it is not easy to reliably share information on surrounding objects in real time using V2X in various environments. Since information on all vehicles located within the vehicle-to-vehicle (V2V) communication radius is received, when GPS information is unstable, it is difficult to determine the vehicle corresponding to the received information.

Consider a principal vehicle for which an autonomous driving system it to be implemented. Even if information on surrounding vehicles is received using V2V communication, the vehicle corresponding to the received information cannot be identified by the principal vehicle. In other words, since the received information cannot specify whether it is a vehicle in front, behind, in the right lane, or in the left lane based on the driving direction of the principal vehicle, it cannot be associated to the implementation of an autonomous driving system.

This V2V communication refers to wireless communication between vehicles and is a technology for exchanging data between moving or stationary vehicles.

This technology allows vehicles within a certain range to exchange position information and traffic situation information based on wireless communication, and information on surrounding vehicles recognized through sensors can also be communicated with each other.

Therefore, when using V2V communication data received from surrounding vehicles, accidents can be prevented in advance by analyzing vehicles in the blind spot of the driver of the principal vehicle in real time and transmitting the analysis to the driver of the principal vehicle. In addition, by transmitting unexpected situations that occur while driving to vehicles located behind the principal vehicle, serial collisions can be prevented. In this way, V2V communication can be used to detect stopped/low-speed vehicles ahead and implement technologies such as emergency braking situations, dangerous situations on the road, and cross-traffic support.

In other words, based on V2V communication, it is possible to transfer position, driving data, and sensing data between vehicles, so that, ideally, it can be provided as configuration data for a driver assistance system to improve the accuracy and stability of the autonomous driving system. However, in reality, the position accuracy of the principal vehicle is low, and when a large number of vehicles are clustered, data through V2V communication cannot be specified as to from which vehicle it is transmitted, making it difficult to use as configuration data for a driver assistance system.

In this regard, KR Registered Patent No. 10-2075831 ("method and apparatus for object number matching between V2V communication and radar sensor") discloses object number matching technology between V2V communication and radar sensor.

SUMMARY

The present invention was devised to solve the above-mentioned problems, and is to provide a vehicle matching system that uses a principal vehicle's RADAR sensing technology to match information on a vehicle running behind the principal vehicle among the information on surrounding vehicles transmitted based on V2V communication, and a method thereof.

In order to solve the above problems, the present invention provides a matching system between at least two vehicles to which vehicle-to-vehicle (V2V) communication function is applied and which are equipped with a radio detecting and ranging (RADAR) sensor. The matching system preferably comprises a V2V communication unit that generates V2V communication data including corresponding vehicle unique information of each vehicle and performs V2V communication with a vehicle positioned nearby, a radar sensor controller in a radar sensor provided in each vehicle that controls to insert a data transmission section into a chirp signal included in a radar signal, modulate the vehicle unique information corresponding to the inserted data transmission section into a signal with a preset frequency and include the modulated signal into a radar signal, and transmit the radar signal, and a radar reception processor that includes a radar signal receiver provided in each vehicle, receives the radar signal from any nearby vehicle, demodulates the received radar signal through a preset frequency, and analyzes unique information of the vehicle that transmitted the radar signal.

Further, the vehicle matching system preferably further comprises a matching determination unit that determines whether the vehicle unique information included in the received V2V communication data matches the vehicle unique information analyzed by the radar reception processor when receiving the V2V communication data from the nearby vehicle according to the V2V communication performance.

Further, when a matching is made as a determination result of the matching determination unit, the corresponding V2V communication data is preferably transferred to an associated control system.

Further, the radar reception processor preferably performs analysis only when a size of the received radar signal exceeds a preset threshold.

Further, the V2V communication units preferably generates the V2V communication data including the unique information in an optional field formed in basic safety message (BSM) data used in the V2V communication.

In order to solve the above problems, the present invention provides a matching method between at least two vehicles to which vehicle-to-vehicle (V2V) communication function using a vehicle matching system in which each step is performed by computational processing means is applied and which are equipped with a radio detecting and ranging (RADAR) sensor. The matching method preferably comprises in a V2V communication unit of each vehicle, a V2V transmission step of generating V2V communication data including corresponding vehicle unique information of each vehicle and performing V2V communication with a vehicle positioned nearby; in a radar sensor controller of each vehicle, a radar transmission step of inserting a data transmission section into a chirp signal included in a radar signal, modulating the vehicle unique information corresponding to the inserted data transmission section into a signal with a preset frequency and including the modulated signal into a radar signal, and then transmitting the radar signal, by using a radar sensor of each sensor; in a radar reception processor of each vehicle, a radar reception step of receiving the radar signal by at least one nearby vehicle; in the radar reception processor of each vehicle, a radar analysis step of demodulating the corresponding radar signal through a preset frequency and analyzing unique information of the vehicle that transmitted the corresponding radar signal when a size of the received radar signal exceeds a preset threshold; in the V2V communication unit of each vehicle, a V2V reception step of receiving the V2V communication data from the nearby vehicle according to the V2V communication performance; in a matching determination unit of each vehicle, a matching determination step of determining whether the vehicle unique information in the V2V communication data received in the V2V receiving step matches the vehicle unique information analyzed by the radar analysis step; and in a matching determination unit of each vehicle, an association step of transmitting the corresponding V2V communication data to an associated control system when the matching is made as a determination result of the matching determination step.

Further, preferably, the radar transmission step applies amplitude shift keying (ASK) modulation, and the radar analysis step applies ASK demodulation.

Further, the V2V transmission step preferably generates the V2V communication data including the unique information in an optional field formed in basic safety message (BSM) data used in the V2V communication.

BRIEF DESCRIPTION OF THE DRAWINGS

FIG. 2 is a diagram illustrating a structure of V2V communication data applied to a vehicle matching system according to an embodiment of the present invention.

FIG. 8 is a diagram illustrating an operating principle of a radar signal receiver applied to a vehicle matching system according to an embodiment of the present invention.

DETAILED DESCRIPTION

Figure 1:
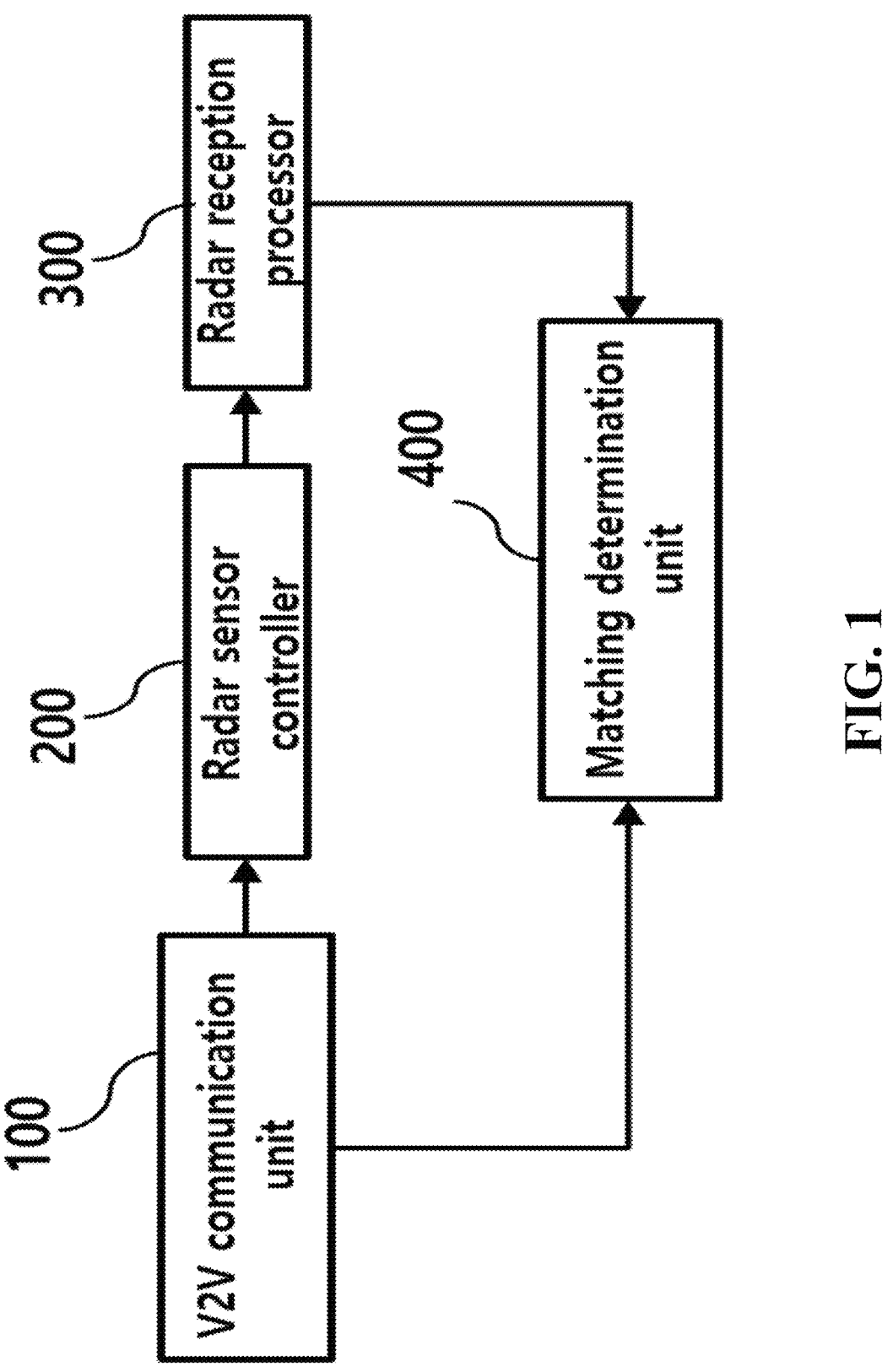
FIG. 1 is an exemplary configuration diagram illustrating a vehicle matching system according to an embodiment of the present invention.

The aforementioned objects, features, and advantages of the present disclosure will be clearer through the following exemplary embodiment associated with the accompanying drawings. The following specific structure or functional explanations are illustrated to describe exemplary embodiments in accordance with the concept of the present disclosure. The exemplary embodiments in accordance with the concept of the present disclosure may be embodied in various forms but are not interpreted to be limited to the exemplary embodiments described in this specification or application. Various modifications and changes may be applied to the exemplary embodiments in accordance with the concept of the present disclosure and the exemplary embodiments may have various forms so that the exemplary embodiments will be described in detail in the specification or the application with reference to the drawings. However, this does not limit the present disclosure within specific exemplary embodiments, and it should be understood that the present disclosure covers all the modifications, equivalents and replacements within the spirit and technical scope of the present disclosure. Terms such as first or second may be used to describe various components but the components are not limited by the above terminologies. The above terminologies are used to distinguish one component from the other component, for example, a first component may be referred to as a second component without departing from a scope in accordance with the concept of the present disclosure and similarly, a second component may be referred to as a first component. It should be understood that, when it is described that an element is "coupled" or "connected" to another element, the element may be directly coupled or directly connected to the other element or coupled or connected to the other element through a third element. On the contrary, it should be understood that when an element is referred to as being "directly connected to" or "directly coupled to" another element, another element does not intervene therebetween. Other expressions to describe the relationship between elements, that is, expressions such as "between", "immediately between", "adjacent to", or "directly adjacent to" need to be also similarly interpreted. Terms used in the present specification are used only to describe specific exemplary embodiments, and are not intended to limit the present disclosure. A singular form may include a plural form if there is no clearly opposite meaning in the context. In this specification, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance. If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in this specification. Hereinafter, an exemplary embodiment of the present disclosure will be described in more detail with reference to the accompanying drawings. Further, the same reference numerals in the drawings denote the same members.

In addition, the system means a set of components including apparatuses, mechanisms, units, etc. which are organized and regularly interact with each other to perform required functions.

A vehicle matching system and method thereof according to an embodiment of the present invention relates to a technology for inputting vehicle unique information (vehicle number, etc.) corresponding to communication data used in V2V communication, transmitting communication data with a unique number to all vehicles within a V2V communication range, including unique information in a radar signal and transmitting the same to a front vehicle using a radar sensor, and matching, by a front vehicle, the unique information included in the communication data (V2V communication data) and the unique information included in the radar signal of the rear vehicle, so that the communication data (V2V communication data) corresponding to the rear vehicle can be specified.

That is, using a principal vehicle as a reference, the principal vehicle uses V2V communication to transmit V2V communication data including unique information to all vehicles within a communication range.

At the same time, since all nearby vehicles within the communication range also use V2V communication to transmit V2V communication data including unique information to the principal vehicle, the principal vehicle also receives V2V communication data from all vehicles within the communication range.

In addition, the principal vehicle uses a radar signal receiver to receive a radar signal from a vehicle located behind.

By analyzing the received radar signal, the unique information included in the radar signal is extracted. The unique information included in all received V2V communication data is analyzed, and the V2V communication data corresponding to the unique information that matches the unique information extracted from the radar signal is matched.

Through this, the principal vehicle can use the V2V communication data of the matched rear vehicle to transmit the included position, driving data, and sensing data to the associated driver assistance function system, enabling the autonomous driving system even in situations where position information is inaccurate. Therefore, it has the advantage of improving reliability and reducing the probability of accidents.

As illustrated in FIG. 1, a vehicle matching system according to an embodiment of the present invention includes a V2V communication unit 100, a radar sensor controller 200, and a radar reception processor 300. It is desirable that each component performs its operation through an operation processing means such as an Electronic Control Unit (ECU) including a computer that performs transmission and reception through a communication channel within the vehicle.

In order to perform the vehicle matching system, the vehicle matching system according to an embodiment of the present invention should be applied with a vehicle-to-vehicle (V2V) communication function and be equipped with a radio detecting and ranging (RADAR) sensor.

In addition, it can be performed when at least two vehicles are driving in the same lane and in the same driving direction within the V2V communication range.

As described above, the present invention is intended to solve the problem that when a large number of vehicles are clustered, it is impossible to identify or specify the vehicle that transmitted the received V2V communication data, making it difficult to utilize the received V2V communication data. Therefore, in the present invention, it is desirable to set a condition in which at least two vehicles drive in the same lane and in the same driving direction within the V2V communication range as the minimum condition requiring vehicle matching.

Before describing each configuration in detail, for smooth explanation, the vehicle matching system according to an embodiment of the present invention will be described based on a principal vehicle.

The V2V communication unit 100 is a V2V communication means provided in each vehicle for V2V communication, and preferably generates V2V communication data.

As described above, the position, driving data, and sensing data of a corresponding vehicle (principal vehicle) can be transmitted through the V2V communication function, but since communication data is transmitted to all vehicles within the V2V communication radius, if there are multiple vehicles nearby and GPS information is inaccurate, it is not possible to identify or specify from which vehicle the received communication data came.

However, as described above, since communication data through V2V communication includes information necessary for various driver assistance functions required in an autonomous driving system, an autonomous driving system can be implemented without sensors when such information utilized.

To this end, the V2V communication unit 100 generates V2V communication data including unique information of the principal vehicle and transmits it to vehicles located nearby, more precisely, to vehicles located within the V2V communication range of the principal vehicle.

In this case, as illustrated in FIG. 2, the V2V communication data inserts unique information (most preferably, vehicle number information, such as license plate data or a Vehicle Identification Number (VIN)) into the Optional field of the Basic Safety Message (BSM) used for V2V communication.

Through this, a radar signal including unique information is transmitted to a front vehicle through the radar sensor controller 200, which will be described later, so that the communication data by a rear vehicle can be specified among the communication data (V2V communication data) received based on V2V communication by the V2V communication unit 100.

It is preferable that the radar sensor controller 200 controls to insert a data transmission section into the chirp signal included in the radar signal in the radar sensor provided in each vehicle, and modulate the unique information of the vehicle corresponding to the inserted data transmission section into a signal with a preset frequency and include the modulated signal into the radar signal, and then transmit the radar signal.

The radar sensor applied to the vehicle matching system according to an embodiment of the present invention is preferably a frequency modulation continuous wave (FMCW) radar sensor, but, it is apparent that the radar sensor is not necessarily limited thereto.

Figure 3:
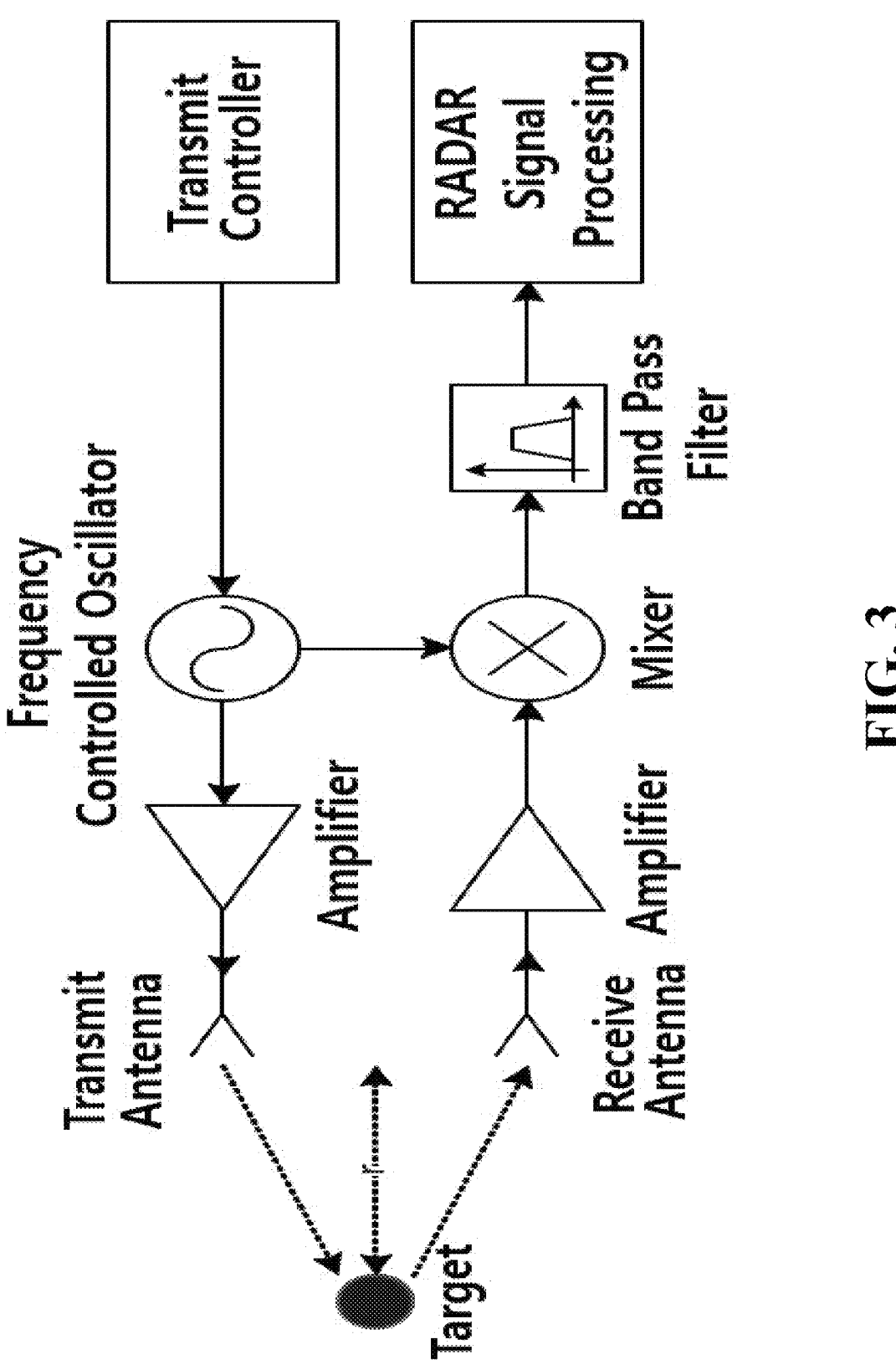
FIG. 3 is a diagram illustrating an operating principle of a typical radar sensor.

For a detailed description, a typical radar sensor is first described. FIG. 3 is a diagram illustrating an operating principle of a typical radar sensor, and FIG. 4 is a diagram illustrating signals transmitted and received by a typical radar sensor.

Figure 4:
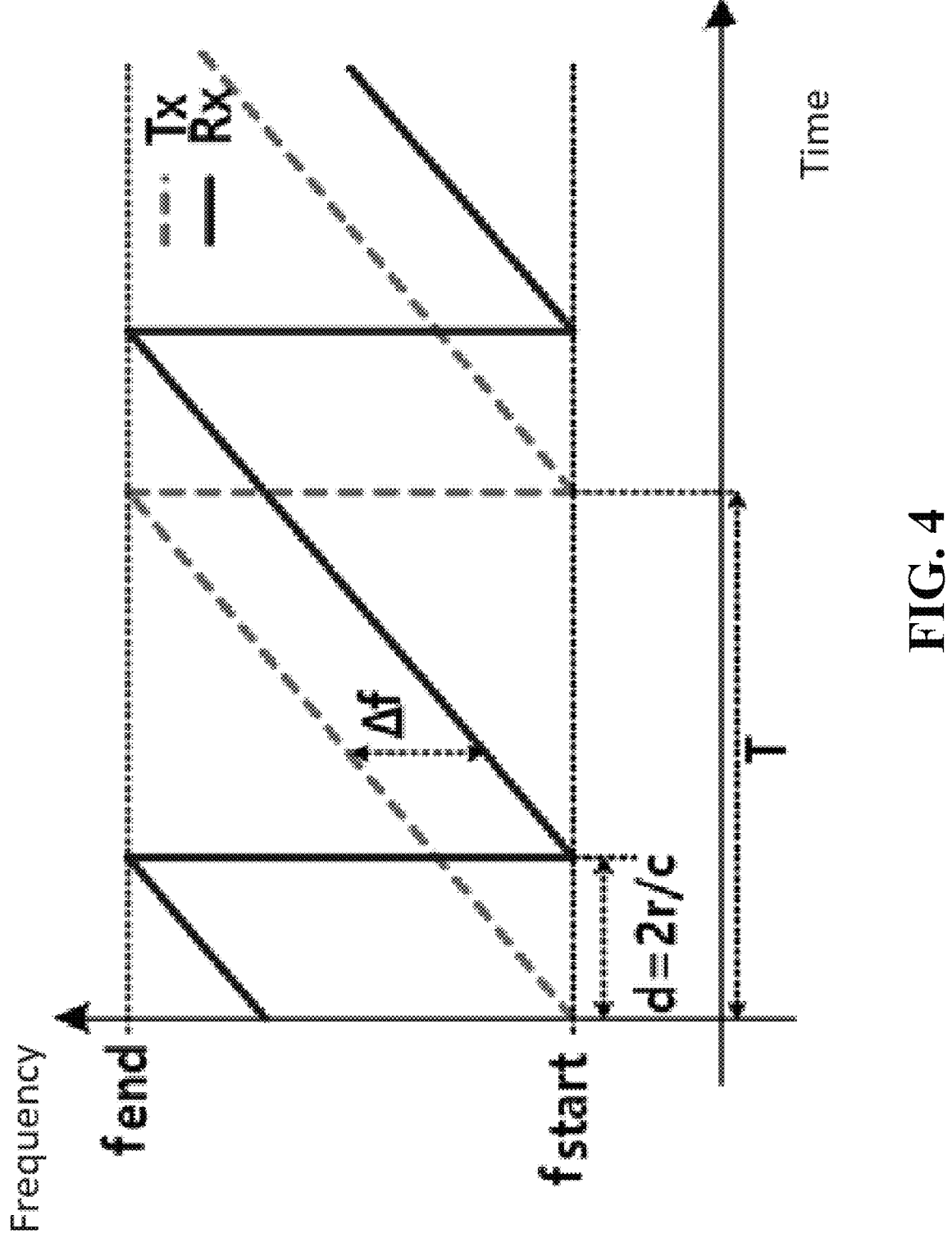
FIG. 4 is a diagram illustrating signals transmitted and received by a typical radar sensor.

That is, as illustrated in FIG. 4, a typical radar sensor transmits a chirp signal whose frequency changes from $f_{start}$ to $f_{end}$ over time, and then calculates a distance (r) to a target using Equation 1 below from the received signal reflected from the target and the frequency difference ($\Delta f$).

$$r = \frac{\Delta f c T}{2(f_{end} - f_{start})} \qquad \text{[Equation 1]}$$

where, c is the speed of light, and T is the period of the chirp signal.

In this case, T, $f_{start}$, and $f_{end}$ of the radar sensor applied to the vehicle are set during a vehicle development process.

Rather than using the operation of a typical radar sensor, an additional operation is required to generate a radar signal including unique information on a principal vehicle.

Figure 5:
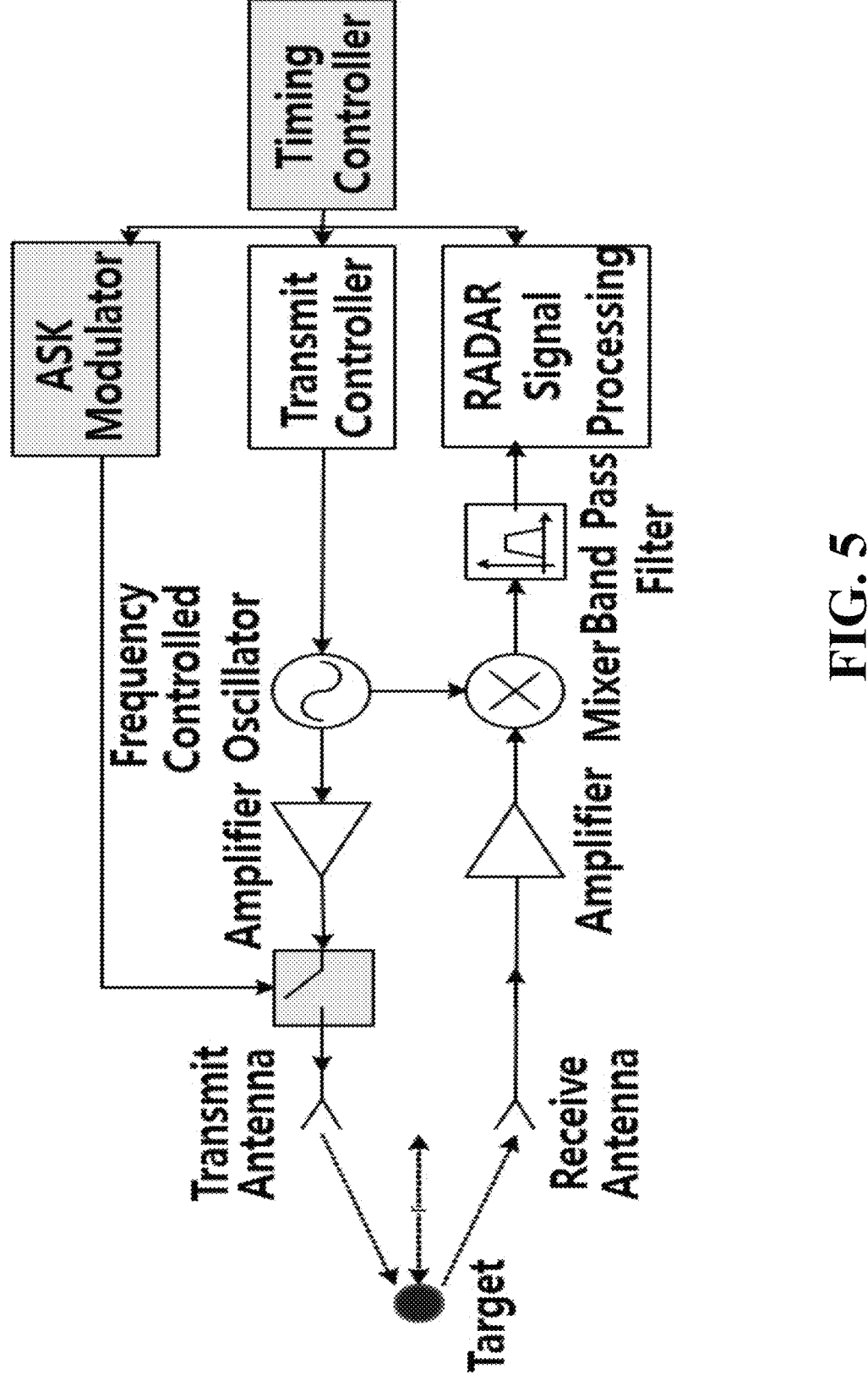
FIG. 5 is a diagram illustrating an operating principle of a radar sensor applied to a vehicle matching system according to an embodiment of the present invention.
Figure 6:
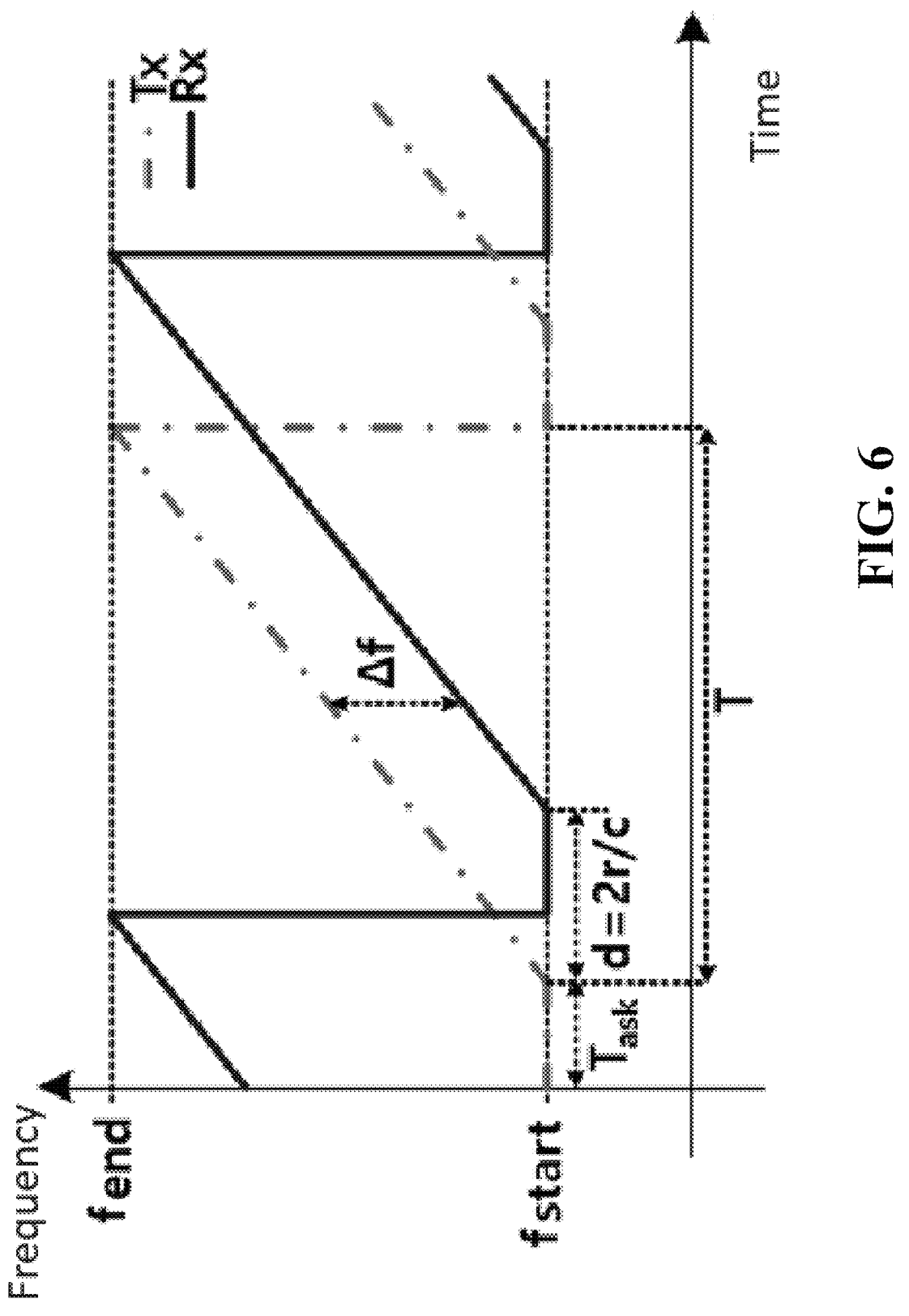
FIG. 6 is a diagram illustrating signals transmitted and received by a radar sensor applied to a vehicle matching system according to an embodiment of the present invention.

FIG. 5 is a diagram illustrating an operating principle of a radar sensor applied to a vehicle matching system according to an embodiment of the present invention, and FIG. 6 is a diagram illustrating signals transmitted and received by a radar sensor applied to a vehicle matching system according to an embodiment of the present invention.

Before generating a chirp signal for target detection, which is the role of a typical radar sensor, the radar sensor controller 200 inserts a communication data transmission section ($T_{ask}$), as illustrated in FIG. 6.

In this case, as illustrated in FIG. 6, the communication data transmission section is preferably inserted before one chirp signal starts or immediately after one chirp signal ends, and the length of the communication data transmission section is set during a vehicle development process.

In addition, the radar sensor controller 200 uses the same hardware as the transmitter of a typical radar sensor to perform amplitude shift keying (ASK) modulation at a preset $f_{start}$ frequency in order to include vehicle unique information in the communication data transmission section.

Figure 7:
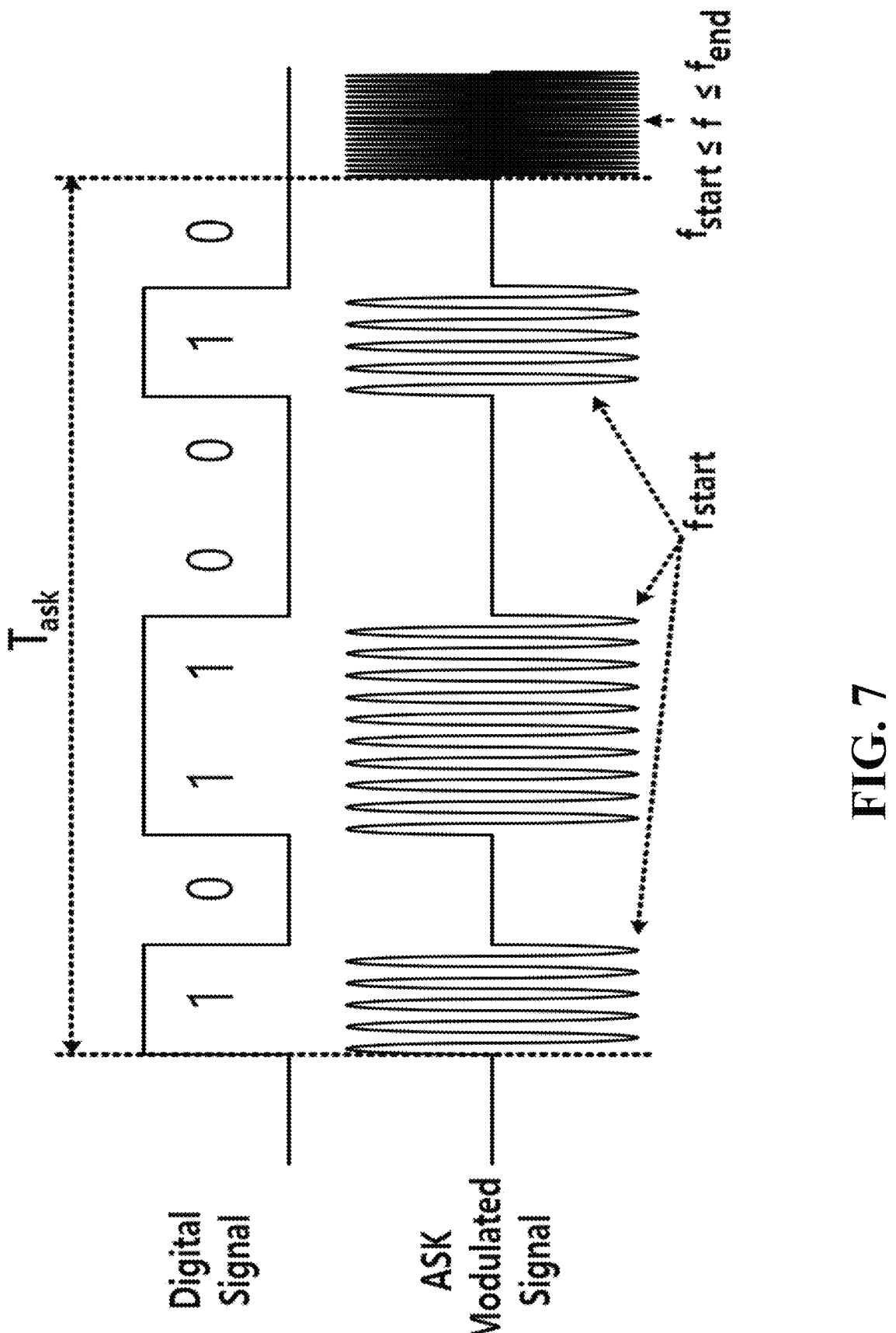
FIG. 7 is a diagram illustrating a data transmission section included in a radar signal by a radar sensor applied to a vehicle matching system according to an embodiment of the present invention.

FIG. 7 is a diagram illustrating a modulation signal included in a communication data transmission section inserted by the radar sensor controller 200.

As illustrated in FIG. 7, through the ASK modulation signal, a high-frequency signal appears when it is 1, and a DC component without frequency appears when it is 0.

Through this, when it is 1, the signal of the $f_{start}$ frequency is transmitted, and when it is 0, the DC component is transmitted. After the communication data transmission section ends, the frequency of a frequency controlled oscillator (FCO) is varied, so that the frequency changes from the $f_{start}$ frequency to the $f_{end}$ frequency, and a chirp signal for target detection is transmitted.

Through this, the target detection, which is a unique function of the radar sensor, is performed.

Thereafter, as illustrated in FIG. 5, the radar sensor detects the received signal reflected from the target, mixes the transmitted and received signals, and then the mixed signals pass through a band pass filter (BPF).

Thereafter, by performing radar signal processing, the target position, such as the distance to the target, is calculated.

The radar reception processor 300 includes a radar signal receiver provided in each vehicle, and receives radar signals from any nearby vehicle.

In this case, the vehicle matching system according to an embodiment of the present invention has technical characteristics of specifying the V2V communication data received from a rear vehicle (a vehicle running directly behind) by a front vehicle in a situation where multiple vehicles exist, and matching to the rear vehicle. Therefore, the radar signal receiver of the radar reception processor 300 is preferably provided in the rear bumper of the vehicle.

It is preferable that the radar reception processor 300 demodulates the received radar signal through a preset frequency and analyzes unique information of the vehicle that transmitted the radar signal.

That is, as described above, in the case of a vehicle to which the vehicle matching system according to an embodiment of the present invention is applied, a communication data transmission section is inserted into the radar signal through the radar sensor controller 200, and the vehicle unique information is modulated and inserted into the communication data transmission section to be transmitted.

Accordingly, when the radar reception processor 300 receives a radar signal including the modulated vehicle unique information, it demodulates the radar signal and analyzes the vehicle unique information that transmitted the radar signal.

In detail, FIG. 8 is a diagram illustrating an operating principle of the radar signal receiver included in the radar reception processor 300.

Through this, when the received radar signal is mixed using a sine wave of $f_{start}$, which is a preset frequency, and then demodulated using a low pass filter (LPF), the high frequency component is removed by the LPF in the chirp signal section. Accordingly, Digital signal 1 is generated only in the communication data transmission section.

Accordingly, when a bit width is fixed, it is possible to restore the digital signal (vehicle unique information) included in the received radar signal.

In this case, $f_{start}$ is set for the radar signal receiver applied to the vehicle during a vehicle development process.

In the present invention, the radar signal receiver included in the radar reception processor 300 is limited to a beacon, but this is only an embodiment of the present invention.

However, since the beacon, which is the radar signal receiver included in the radar receiving processor 300, may be configured to only receive signals without transmitting them, as illustrated in FIG. 8, it can be configured relatively simply compared to a typical radar signal reception processing means.

In addition, the radar reception processor 300 performs analysis only when the size of the received radar signal exceeds a preset threshold. That is, only when the size of the received radar signal exceeds a preset threshold, the received radar signal is demodulated through a preset frequency to analyze the unique information of the vehicle that transmitted the radar signal.

This means that when a transmission beam is fired as a radar signal to the front of a running vehicle using a radar signal, the signal spreads radially, and the radar signal receiver also has a unique reception beam pattern.

Since the energy received by the beacon in total is the product of the transmission beam pattern and the reception beam pattern, in order to ensure that the radar signal is received only by a front vehicle driving directly in front, in the transmission vehicle (rear vehicle), a front long-distance radar sensor with the minimum beam angle is used to minimize a transmission range, and in the reception vehicle (front vehicle), the radar signal receiver is mounted on the rear bumper of the vehicle, and is configured such that the size of the signal transmitted from the front and rear is maximized.

Through this, both the transmission beam pattern of the radar signal by the radar sensor controller 200 and the reception beam pattern of the beacon that receives the radar signal by the radar reception processor 300 have a maximum value at the front, and the size of the radar signal transmitted from a vehicle positioned in another lane becomes smaller compared to this. Accordingly, when performing ASK demodulation on the radar signal received in the radar reception processor 300, a preset threshold is used to determine whether it is the radar signal received from a vehicle positioned immediately behind or the radar signal received from a vehicle positioned in another lane. As a result, only when the radar signal is received from a vehicle positioned immediately behind, the received radar signal is demodulated through a preset frequency and the unique information of the vehicle that transmitted the radar signal is analyzed.

In this case, the preset threshold is set during a vehicle development process.

In addition, as illustrated in FIG. 8, the radar signal receiver has a single-channel structure because only the front signal is constructively interfered with, unlike the radar sensor that requires additional hardware for each reception channel. Therefore, in order to minimize the reception beam angle, even if multiple antennas are used, the antenna and adder can be implemented with only a PCB pattern, so there is an advantage in that the radar signal receiver can be implemented at minimal cost.

Figure 9:
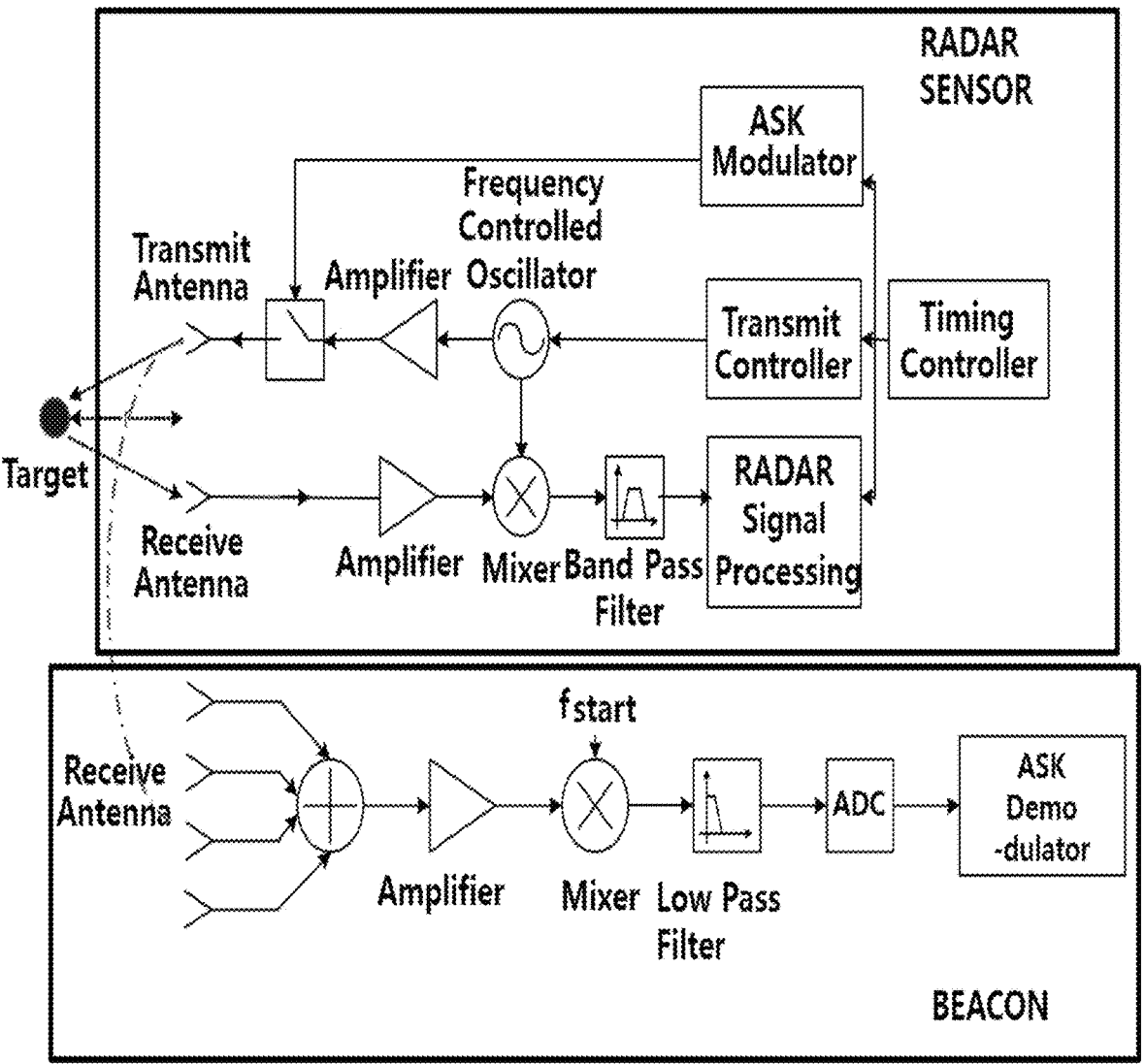
FIG. 9 is a diagram illustrating integrated operating principles of a radar sensor and radar signal receiver applied to a vehicle matching system according to an embodiment of the present invention.

FIG. 9 is a diagram illustrating integrated operating principles of the radar sensor and radar signal receiver applied to a vehicle matching system according to an embodiment of the present invention.

That is, as illustrated in FIG. 9, the radar sensor of the radar sensor controller 200 uses an analog switch to perform ASK modulation of corresponding vehicle unique information and transmit the same. The transmitted signal is received by the radar signal receiver (beacon) of the vehicle positioned in front, ASK demodulated, passed through the LPF, so that the influence due to the chirp signal section after the communication data transmission section is removed.

Apparently, the radar sensor transmits and receives chirp signals through the chirp signal section after the communication data transmission section, and obtains the target distance from the frequency difference.

In this case, by setting the radar sensor and the radar signal receiver to use the same frequency and bit time, the transmitted radar signal is demodulated and unique information is analyzed from the demodulated digital signal.

In addition, the vehicle matching system according to an embodiment of the present invention further includes a matching determination unit 400, as illustrated in FIG. 1.

When V2V communication data is received from a nearby vehicle according to the performance of V2V communication, the matching determination unit 400 determines whether the vehicle unique information included in the received V2V communication data matches the vehicle unique information analyzed by the radar reception processor 300.

In other words, to the extent that the principal vehicle communicates and processes the V2V communication data including unique information for all vehicles in the V2V communication range through the V2V communication unit 100, other vehicles also communicates and processes the V2V communication data including its unique information when the principal vehicle is in the V2V communication range.

Therefore, when the principal vehicle is positioned in the V2V communication range of another vehicle, the matching determination unit 400 determines whether there is the V2V communication data including the unique information matching the vehicle unique information analyzed by the radar reception processor 300 among a plurality piece of received V2V communication data.

As a result of the determination of the matching determination unit 400, if there is the V2V communication data that includes unique information matching the vehicle unique information analyzed by the radar reception processor 300, the corresponding V2V communication data can be specified as data processed through V2V communication processing of a vehicle positioned behind the principal vehicle.

Thereafter, the matching determination unit 400 transmits the corresponding V2V communication data to the driver assistance function-related system associated to the principal vehicle.

Through this, the principal vehicle (front vehicle) can determine whether there is a collision or sensing data based on the V2V communication data received from the matched rear vehicle, thereby improving the reliability of the autonomous driving controller even in situations where position information is inaccurate and reducing the probability of an accident.

Figure 10:
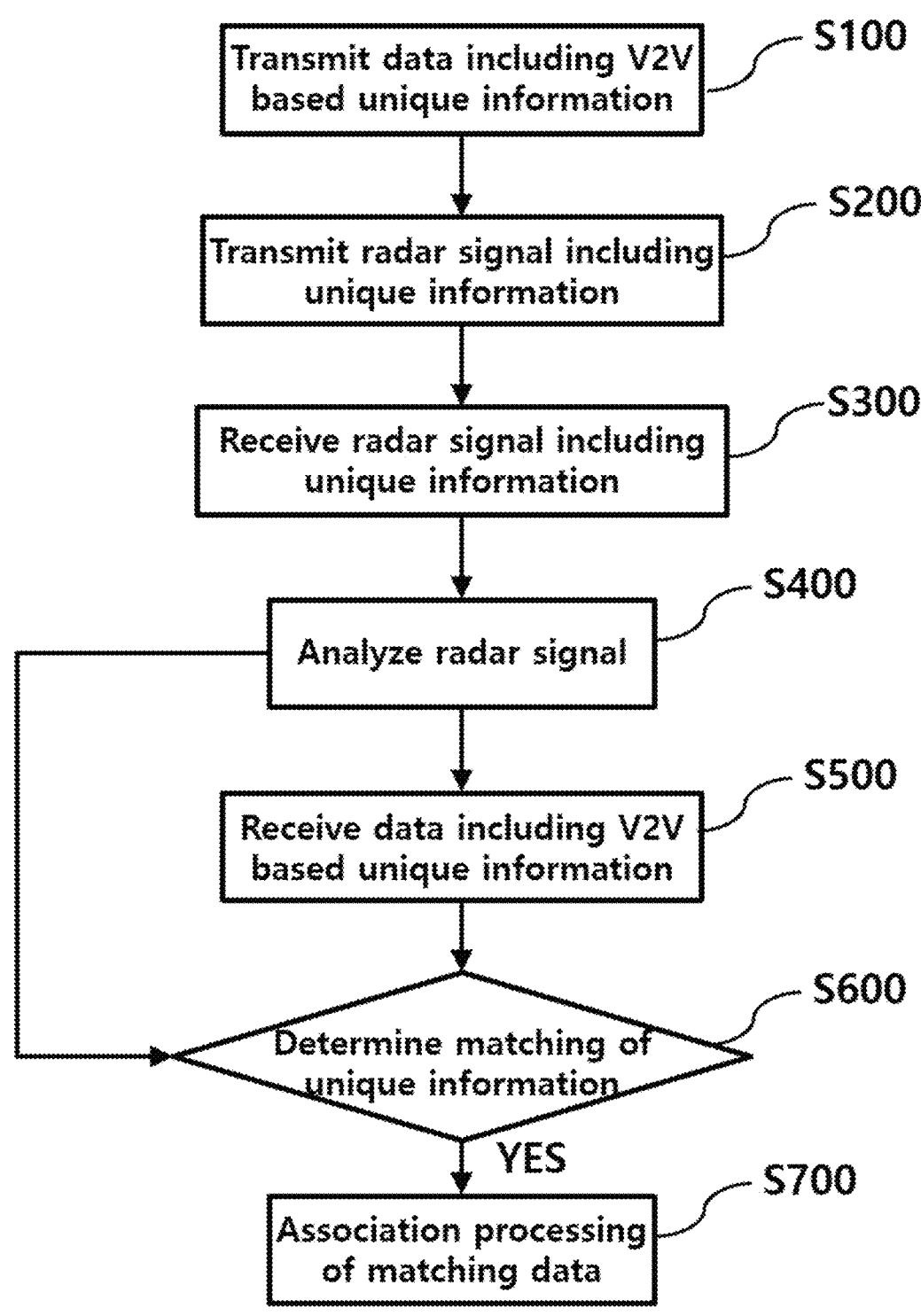
FIG. 10 is a flow diagram illustrating a vehicle matching method according to an embodiment of the present invention.

FIG. 10 illustrates a flowchart of a vehicle matching method according to an embodiment of the present invention.

As illustrated in FIG. 10, a vehicle matching method according to an embodiment of the present invention includes a V2V transmission step (S100), a radar transmission step (S200), a radar reception step (S300), a radar analysis step (S400), a V2V reception step (S500), a matching determination step (S600), and an association step (S700). Each step is applied with a V2V communication function using a vehicle matching system performed by computational processing means, and it is preferable to use a matching method between at least two vehicles equipped with a radio detecting and ranging (RADAR) sensor.

Briefly, in the vehicle matching method according to an embodiment of the present invention, unique information is included through V2V communication and transmitted to all vehicles within the communication range. Then, by using a radar sensor in the rear vehicle to transmit ASK-modulated unique information limited to the front vehicle area, the utilization of V2V communication data can be improved through matching of unique information.

For smooth description, each step is described in detail based on a principal vehicle. In the V2V transmission step (S100), the V2V communication unit 100 of the principal vehicle generates V2V communication data including the unique information of the principal vehicle and transmits it to a nearby vehicle, more precisely, a vehicle positioned within the V2V communication range of the principal vehicle.

In this case, as illustrated in FIG. 2, the V2V communication data inserts unique information (most preferably, vehicle number information) into the Optional field of the basic safety message (BSM) used for V2V communication.

In the radar transmission step (S200), the radar sensor controller 200 of the principal vehicle controls to insert a communication data transmission section into the chirp signal included in the radar signal using the radar sensor mounted on the principal vehicle, modulate the vehicle unique information corresponding to the inserted communication data transmission section into a signal with a preset frequency and include the modulated signal into a radar signal, and then, transmit the radar signal.

The radar sensor to which the present invention is applied is preferably a frequency modulation continuous wave (FMCW) radar sensor, but, it will be apparent that the sensor is not necessarily limited thereto.

For a detailed description, first a typical radar sensor is reviewed. FIG. 3 is a diagram illustrating an operating principle of a typical radar sensor, and FIG. 4 is a diagram illustrating a signal transmitted and received by a typical radar sensor.

That is, as illustrated in FIG. 4, a typical radar sensor transmits a chirp signal whose frequency changes from $f_{start}$ to $f_{end}$ over time, and then calculates a distance (r) to a target using Equation 1 above from the received signal reflected from the target and the frequency difference ($\Delta f$).

In this case, T, $f_{start}$, and $f_{end}$ of the radar sensor applied to the vehicle are set during a vehicle development process.

Rather than using the operation of a typical radar sensor, an additional operation is required to generate the radar signal including unique information on the principal vehicle.

FIG. 5 is a diagram illustrating an operating principle of a radar sensor applied to a vehicle matching system according to an embodiment of the present invention, and FIG. 6 is a diagram illustrating signals transmitted and received by a radar sensor applied to a vehicle matching system according to an embodiment of the present invention.

In the radar transmission step (S200), as illustrated in FIG. 6, a communication data transmission section ($T_{ask}$) is inserted before generating a chirp signal for the target detection, which is the role of a typical radar sensor.

In this case, as illustrated in FIG. 6, the communication data transmission section is preferably inserted before one chirp signal starts or immediately after one chirp signal ends, and the length of the communication data transmission section is set during a vehicle development process.

In addition, the same hardware as the transmitter of a typical radar sensor is used to perform amplitude shift keying (ASK) modulation at a preset $f_{start}$ frequency in order to include vehicle unique information in the communication data transmission section.

FIG. 7 is a diagram illustrating a modulation signal included in a communication data transmission section inserted by the radar sensor controller 200.

As illustrated in FIG. 7, through the ASK modulation signal, a high-frequency signal appears when it is 1, and a DC component without frequency appears when it is 0.

Through this, when it is 1, the signal of the $f_{start}$ frequency is transmitted, and when it is 0, the DC component is transmitted. After the communication data transmission section ends, the frequency of a frequency controlled oscillator (FCO) is varied, so that the frequency changes from the $f_{start}$ frequency to the $f_{end}$ frequency, and a chirp signal for target detection is transmitted.

Through this, the target detection, which is a unique function of the radar sensor, is performed.

Thereafter, as illustrated in FIG. 5, the radar sensor detects the received signal reflected from the target, mixes the transmitted and received signals, and then the mixed signals pass through a band pass filter (BPF).

Thereafter, by performing radar signal processing, the target position, such as the distance to the target, is calculated.

In the radar reception step (S300), the radar reception processor 300 of the principal vehicle receives radar signals from any nearby vehicle by using the radar signal receiver provided in the principal vehicle.

In this case, the present invention has technical characteristics of specifying the V2V communication data received from a rear vehicle (a vehicle running directly behind) by a front vehicle in a situation where multiple vehicles exist, and matching to the rear vehicle. Therefore, the radar signal receiver is preferably provided in the rear bumper of the vehicle.

In the radar analysis step (S400), when the size of the radar signal received in the radar reception step (S300) exceeds a preset threshold, the radar reception processor 300 of the principal vehicle demodulates a corresponding radar signal through a preset frequency to analyze the unique information of the vehicle that transmitted the corresponding radar signal.

In detail, when a transmission beam is fired as a radar signal to the front of a running vehicle using a radar signal, the signal spreads radially, and the radar signal receiver also has a unique reception beam pattern.

Since the energy received by the beacon in total is the product of the transmission beam pattern and the reception beam pattern, in order to ensure that the radar signal is received only by a front vehicle driving directly in front, in the transmission vehicle (rear vehicle), a front long-distance radar sensor with the minimum beam angle is used to minimize a transmission range, and in the reception vehicle (front vehicle), the radar signal receiver is mounted on the rear bumper of the vehicle, and is configured such that the size of the signal transmitted from the front and rear is maximized.

Through this, both the transmission beam pattern of the radar signal and the reception beam pattern of the receiving beacon have a maximum value at the front, and the size of the radar signal transmitted from a vehicle positioned in another lane becomes smaller compared to this.

Accordingly, in the radar analysis step (S400), before performing ASK demodulation on the radar signal received, a preset threshold is used to determine whether it is the radar signal received from a vehicle positioned immediately behind or the radar signal received from a vehicle positioned in another lane. As a result, only when the radar signal is received from a vehicle positioned immediately behind, the received radar signal is demodulated through a preset frequency and the unique information of the vehicle that transmitted the radar signal is analyzed.

In this case, the preset threshold is set during a vehicle development process.

In addition, as illustrated in FIG. 8, the radar signal receiver has a single-channel structure because only the front signal is constructively interfered with, unlike the radar sensor that requires additional hardware for each reception channel. Therefore, in order to minimize the reception beam angle, even if multiple antennas are used, the antenna and adder can be implemented with only a PCB pattern, so there is an advantage in that the radar signal receiver can be implemented at minimal cost.

In the radar analysis step (S400), the received radar signal is demodulated through a preset frequency to analyze the unique information of the vehicle that transmitted the radar signal.

In detail, FIG. 8 is a diagram illustrating an operating principle of the radar signal receiver included in the radar reception processor 300.

Through this, after the received radar signal is mixed using a sine wave of $f_{start}$, which is a preset frequency, when the mixed signal is demodulated using a low pass filter (LPF), the high frequency component is removed by the LPF in the chirp signal section. Accordingly, Digital signal 1 is generated only in the communication data transmission section.

Accordingly, when a bit width is fixed, it is possible to restore the digital signal (vehicle unique information) included in the received radar signal.

In this case, $f_{start}$ is set for the radar signal receiver applied to the vehicle during a vehicle development process.

However, since the beacon, which is the radar signal receiver included in the radar reception processor 300, may be configured to only receive signals without transmitting them, as shown in FIG. 8, it is relatively simple compared to a typical radar signal reception processing means.

In the V2V reception step (S500), the V2V communication unit 100 of the principal vehicle receives V2V communication data from a nearby vehicle according to the performance of V2V communication.

In other words, to the extent that the principal vehicle communicates and processes the V2V communication data including unique information for all vehicles in the V2V communication range, other vehicles also communicates and processes the V2V communication data including its unique information when the principal vehicle is in the V2V communication range.

In the matching determination step (S600), the matching determination unit 400 of the principal vehicle determines whether the vehicle unique information included in the V2V communication data received in the V2V reception step (S500) matches the vehicle unique information analyzed in the radar analysis step (S400).

That is, whether there is the V2V communication data including the unique information matching the analyzed vehicle unique information, among a plurality piece of received V2V communication data is determined.

As a result of the determination, if there is the V2V communication data that includes unique information matching the analyzed vehicle unique information, the corresponding V2V communication data can be specified as data processed through V2V communication processing of a vehicle positioned behind the principal vehicle.

In the association step (S700), when the matching is made as the determination result in the matching determination step (S600), the matching determination unit 400 transmits the corresponding V2V communication data to the driver assistance function-related system associated to the principal vehicle when.

Through this, the principal vehicle (front vehicle) can determine whether there is a collision or sensing data based on the V2V communication data received from the matched rear vehicle, thereby improving the reliability of the autonomous driving controller even in situations where position information is inaccurate and reducing the probability of an accident.

The above-described invention can be implemented in a program recorded medium as computer-readable codes. The computer-readable media may include all kinds of recording devices in which data readable by a computer system are stored. The computer-readable media may include hard disk drive (HDD), solid state disk (SSD), silicon disk drive (SDD), ROM, RAM, CD-ROM, magnetic tapes, floppy discs, optical data storage devices, and the like, and also include carrier-wave type implementations (e.g., transmission via Internet). Further, the computer may also include a horn generating system using the ultrasonic sensor of the present invention.

According to the vehicle matching system and method thereof according to the present invention as described above, unique information is included through V2V communication and transmitted to all vehicles within the communication range, and then, by using the radar sensor in the rear vehicle to transmit ASK-modulated unique information limited to the front vehicle area, there is an advantage in improving the utilization of V2V communication data through matching of unique information.

Through this, since the principal vehicle can obtain information such as whether there is a collision or sensing information from the information included in the V2V communication data of the matched rear vehicle, there are advantages of improving the reliability of an autonomous driving controller even in situations where position information is inaccurate and reducing the probability of an accident.

That is, by using the driving state of the front vehicle, which the principal vehicle can directly determine, and the driving state through the matching V2V communication data of the rear vehicle, which cannot be directly determined by the principal vehicle, if emergency braking occurs in both the front and rear vehicles, the principal vehicle can also perform an emergency braking, thereby shortening an idle distance and reducing the risk of an accident In addition, when the results recognized by the principal vehicle's sensors and the communication data received from the rear vehicle through V2V communication are integrated and used, the reliability of the autonomous driving controller can be greatly improved.

Although preferred embodiments of the present invention have been described above, the embodiments disclosed in the present invention are not intended to limit the technical idea of the present invention but are disclosed for illustrative. Accordingly, the technical idea of the present invention includes not only each disclosed embodiment, but also a combination of the disclosed embodiments, and furthermore, the scope of the technical idea of the present invention is not limited by these embodiments. Further, it will be apparent to those having ordinary skill in the art that various modifications and changes to the invention as described herein may be made, none of which depart from the spirit of the present invention. All such modifications and changes should therefore be seen as within the scope of the present invention.

What is claimed is:

1. A matching system for a vehicle using vehicle-to-vehicle (V2V) communication with at least one other vehicle, where each vehicle is equipped with a radio detecting and ranging (RADAR) sensor, the matching system comprising:

- a V2V communication unit programmed to generate V2V communication data including unique vehicle information of the vehicle and perform V2V communication with a vehicle positioned nearby;
- a radar sensor controller in the radar sensor to insert a data transmission section into a chirp signal included in a radar signal, modulate the unique vehicle information into the inserted data transmission section using a signal with a preset frequency, include the modulated signal in the radar signal, and transmit the radar signal; and a radar reception processor, that includes a radar signal receiver, to receive the radar signal from any nearby vehicle, demodulate the received radar signal through a preset frequency, and analyze unique vehicle information of the vehicle that transmitted the radar signal.

2. The vehicle matching system of claim 1, further comprising a matching determination unit to determine whether the unique vehicle information included in a received V2V communication data matches the unique vehicle information analyzed by the radar reception processor when receiving the V2V communication data from the nearby vehicle.

3. The vehicle matching system of claim 2, wherein, when the matching determination unit determines a match, the V2V communication data corresponding to a matched vehicle is transferred to an associated control system.

4. The vehicle matching system of claim 2, wherein the radar reception processor performs analysis only when a size of the received radar signal exceeds a preset threshold.

5. The vehicle matching system of claim 1, wherein the V2V communication unit places the V2V communication data, including the unique vehicle information, in an optional field in basic safety message (BSM) data used in the V2V communication.

6. A matching method for a vehicle using vehicle-to-vehicle (V2V) communication with at least one other vehicle, wherein each vehicle is equipped with a radio detecting and ranging (RADAR) sensor, the matching method comprising:

in a V2V communication unit of each vehicle, generating V2V communication data including unique vehicle information for each vehicle and performing V2V communication with a vehicle positioned nearby;

in a radar sensor controller of each vehicle, inserting a data transmission section into a chirp signal included in a radar signal, modulating the unique vehicle information into the inserted data transmission section using a signal with a preset frequency, and including the modulated signal in the radar signal, and then transmitting the radar signal;

in a radar reception processor of each vehicle, receiving the radar signal from at least one nearby vehicle;

in the radar reception processor of each vehicle, demodulating the radar signal through a preset frequency and analyzing the unique vehicle information of the vehicle that transmitted the demodulated radar signal when a size of the received radar signal exceeds a preset threshold;

in the V2V communication unit of each vehicle, receiving the V2V communication data from the nearby vehicle;

in a matching determination unit of each vehicle, determining whether the unique vehicle information in the V2V communication data received matches the unique vehicle information analyzed by the radar reception processor; and in a matching determination unit of each vehicle, transmitting the corresponding V2V communication data to an associated control system when a match is determined by the matching determination unit.

7. The vehicle matching method of claim 6, wherein:

the radar signal transmitting applies amplitude shift keying (ASK) modulation, and the radar reception processor applies ASK demodulation.

8. The vehicle matching method of claim 6, wherein the unique vehicle information is included in an optional field in basic safety message (BSM) data in the V2V communication data.

* * * * *